UNITED STATES PATENT OFFICE.

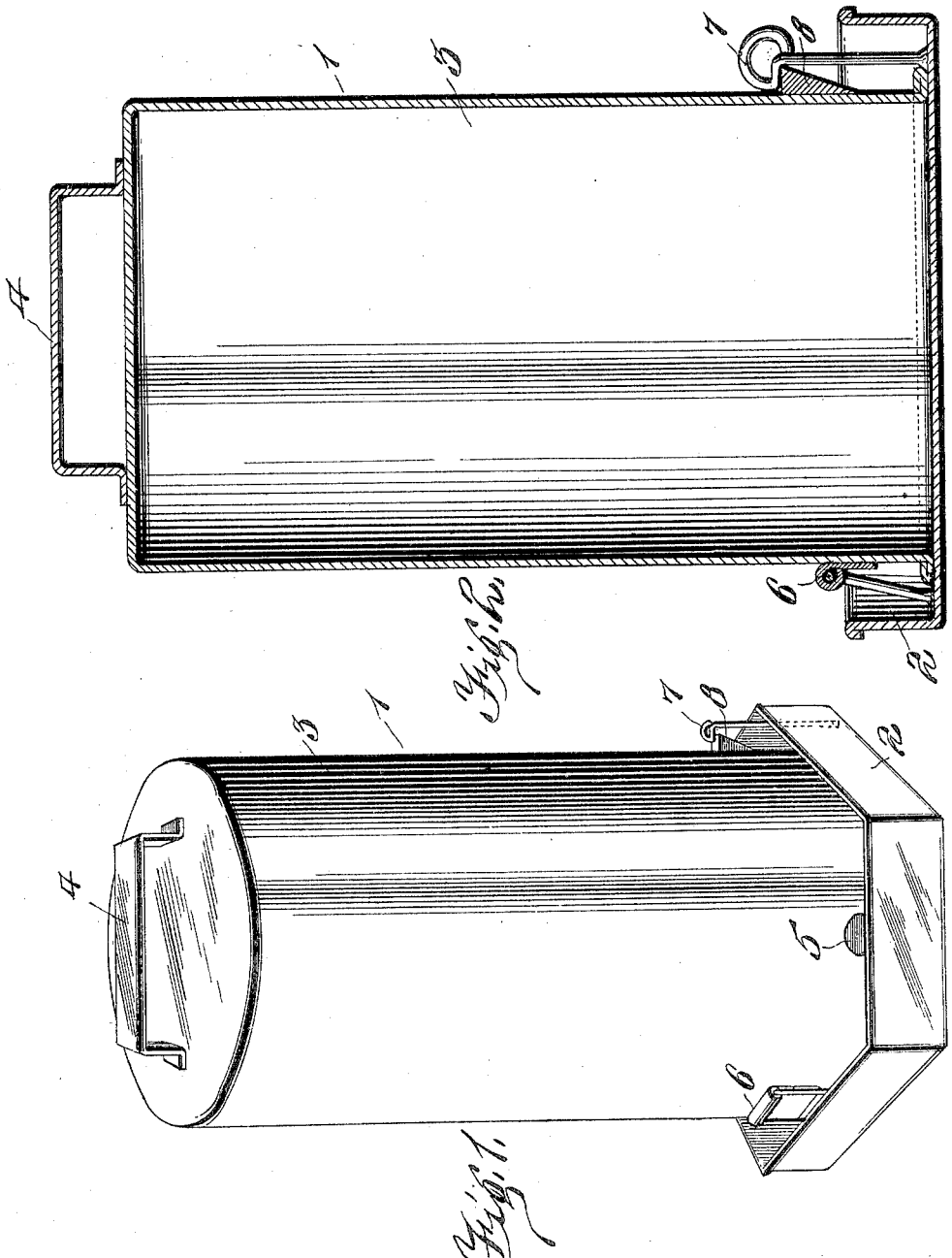

BENJAMIN F. HOUSE, OF EUREKA, ILLINOIS.

DRINKING-FOUNTAIN.

No. 821,493.  Specification of Letters Patent.  Patented May 22, 1906.

Application filed August 3, 1905. Serial No. 272,568.

*To all whom it may concern:*

Be it known that I, BENJAMIN F. HOUSE, a citizen of the United States, residing at Eureka, in the county of Woodford and State of Illinois, have invented certain new and useful Improvements in Drinking-Fountains; and I do declare the following to be a full, clear, and exact description of the invention, such as will enable others skilled in the art to which it appertains to make and use the same.

My invention relates to improvements in dringink-fountains for poultry and live stock; and it consists in the novel construction, combination, and arrangement of parts hereinafter described and claimed.

The object of the invention is to provide a simple and efficient sanitary drinking-fountain in which the water will be prevented from being contaminated by the fowls and in which it will be impossible for the chicks or other small birds to fall in and drown.

The above and other objects, which will appear as the nature of the invention is better understood, are accomplished by the construction illustrated in the accompanying drawings, in which—

Figure 1 is a perspective view of my improved sanitary drinking-fountain, and Fig. 2 is a vertical sectional view through the same.

Referring to the drawings by numeral, 1 denotes my improved drinking-fountain, which comprises a base-pan 2 and a water receptacle or reservoir 3. The pan 2 may be of any desired form; but as shown it is hexagonal. The tank or reservoir 3 is preferably in the form of a cylinder, which is closed at one end and open at its other end. This cylinder has at its top or closed end a broad U-shaped handle 4, upon which it may be supported when in an inverted position, and in the side wall of the same adjacent to its open end is an outlet-opening 5. The reservoir 3 is adapted to be supported in an inverted position upon the center of the bottom of the pan 2 and is pivotally or hingedly connected thereto, as shown at 6. At a point diametrically opposite the hinged connection 6 is provided a fastening device 7, preferably in the form of a spring-catch, which is secured upon the bottom of the pan 2 and adapted to engage a lug or keeper 8, provided upon the reservoir 3.

The construction, use, and advantages of the invention will be readily seen upon reference to the drawings. When it is desired to fill the reservoir 3, the same is held or supported in an inverted position and filled with water until it overflows from the opening 5. The pan 2 is then swung over upon the open end of the reservoir and secured by the catch 7. The device is then turned to its upright or normal position, so that a portion of the water in the reservoir will flow from the opening 5 and fill the tank 1. A constant level of the water in the pan will be maintained until the reservoir 3 is emptied. While the fowl or poultry may drink freely from the water in the pan 2, it will be impossible for them to get into the same, and owing to the narrow space between the sides of the pan and the reservoir 3 it will be impossible for the little chicks to fall into the water and drown or get wet and chilled.

Various changes in the form, proportion, and the minor details of construction may be resorted to without departing from the principle or sacrificing any of the advantages of the invention.

Having thus described my invention, what I claim as new, and desire to secure by Letters Patent, is—

The herein-described drinking-fountain comprising the pan, the reservoir, conforming in shape to and of less width than the pan, closed at its upper end, open at its lower end, hinged near its lower end at one side to the pan and provided on the opposite side with the keeper 8, the said reservoir being further provided on its closed end with the broad U-shaped handle 4, for the purpose set forth, and the spring-catch 7 comprising the rod having its lower end secured to the pan and its upper end bent to form an eye and shoulder coacting with the keeper 8 to lock the reservoir to the pan.

In testimony whereof I have hereunto set my hand in presence of two subscribing witnesses.

BENJAMIN F. HOUSE.

Witnesses:
 U. H. VANFOSSEN,
 E. J. DAVIDSON.